United States Patent
Grundke

(10) Patent No.: US 6,874,600 B2
(45) Date of Patent: Apr. 5, 2005

(54) MOUNTING ARRANGEMENT FOR A CABLE CONTROL OF A PARKING BRAKE OF A MOTOR VEHICLE

(75) Inventor: Edgar Grundke, Ditzingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/428,824

(22) Filed: May 5, 2003

(65) Prior Publication Data

US 2003/0205435 A1 Nov. 6, 2003

(30) Foreign Application Priority Data

May 4, 2002 (DE) .......................................... 102 20 016

(51) Int. Cl.$^7$ ................................................ B60T 1/00
(52) U.S. Cl. ..................... 188/2 D; 188/73.32; 188/361; 188/151 A; 188/216; 74/502.4; 74/502.6
(58) Field of Search ............................ 74/502.4, 502.6, 74/500.5, 501.5 R; 188/2 D, 30, 31, 60, 61, 72.6, 73.32, 361, 151 A, 196 R, 196 M, 211, 216, 265

(56) References Cited

U.S. PATENT DOCUMENTS

| | | | | |
|---|---|---|---|---|
| 4,304,148 A | * | 12/1981 | Hamman | 74/502.4 |
| 4,464,950 A | * | 8/1984 | Deligny | 74/501.5 R |
| 4,798,098 A | * | 1/1989 | Keller et al. | 74/470 |
| 4,854,186 A | * | 8/1989 | Jakob et al. | 74/501.5 R |
| 5,039,138 A | * | 8/1991 | Dickirson | 285/314 |
| 5,105,682 A | * | 4/1992 | Jung | 74/502.4 |
| 5,119,689 A | * | 6/1992 | Adams et al. | 74/502.5 |
| 5,207,116 A | * | 5/1993 | Sultze | 74/502.4 |
| 5,394,770 A | * | 3/1995 | Boike et al. | 74/502.4 |
| 5,570,612 A | * | 11/1996 | Reasoner | 74/502.6 |
| 5,823,063 A | * | 10/1998 | Nagle et al. | 74/502.6 |
| 5,865,066 A | * | 2/1999 | Osborn et al. | 74/502.4 |
| 5,921,143 A | * | 7/1999 | Castillo et al. | 74/502.4 |
| 6,247,380 B1 | * | 6/2001 | Cebollero | 74/502.6 |

FOREIGN PATENT DOCUMENTS

| | | |
|---|---|---|
| DE | 38 05 046 | 6/1989 |
| DE | 40 07 954 | 9/1991 |

* cited by examiner

Primary Examiner—Jack Lavinder
Assistant Examiner—Devon Kramer
(74) Attorney, Agent, or Firm—Crowell & Moring LLP

(57) ABSTRACT

A cable control which can be mounted in a simple manner in an expanding lock of a braking device for a motor vehicle, a so-called cable slack of the cable end is required in the area of the expanding lock. For eliminating this cable slack again in a simple manner, a holding device is provided in the wheel carrier which comprises a sliding sleeve and of a fixing sleeve, between which locking devices are arranged, so that the cable slack can be eliminated when the sliding sleeve is slid in the fixing sleeve.

12 Claims, 3 Drawing Sheets

MOUNTING ARRANGEMENT FOR A CABLE CONTROL OF A PARKING BRAKE OF A MOTOR VEHICLE

BACKGROUND AND SUMMARY OF THE INVENTION

This application claims the priority of German Application No. 102 20 016.5 filed May 4, 2002, the disclosure of which is expressly incorporated by reference herein.

The invention relates to a mounting arrangement for a cable control of a foot parking brake, particularly for a foot parking brake of a motor vehicle.

From German Patent Document DE 38 05 046 A1, an arrangement is known for the automatic length adjustment of a Bowden cable which consists of spacer disks which are displaceable transversely to a hose bushing, rest on the hose and successively fall onto the hose end when, because of an operationally caused hose shortening or cable lengthening, the latter is pressed out of the receiving bore.

With respect to the mounting arrangement, an object of the invention is to further develop a mounting arrangement for a cable control of a parking brake such that a simple connecting of a cable end with an expanding lock of a shoe-type braking device is ensured.

According to the invention, this object is achieved by providing a mounting arrangement for a cable control of a parking brake of a motor vehicle, particularly for a foot parking brake, a cable sheath of the cable control being arranged by way of a holding device in a wheel carrier, and a cable guided in the cable sheath being able to be hung by means of its one end in an expanding lock of a braking device and by means of its other cable end, which faces away, being held in a transmitting device which can be connected with a pedal of a parking brake, wherein the holding device comprises a sliding sleeve with a fixing sleeve which rests against the wheel carrier and in which the sliding sleeve can be axially slidably adjusted from a mounting position with a cable end held with a cable slack with respect to the expanding lock into a fixing position, with a cable end, which is held in a tensioned manner in the expanding lock, in the fixing sleeve. Additional advantageous characteristics of preferred embodiments of the invention are described herein and in the claims.

Principal advantages achieved by means of the invention are that a cable control for a parking brake can be mounted in a simple manner when the braking device is already installed; this means that the cable control has a so-called "cable slack" and can simply be hung into the expanding lock of the braking device, and subsequently the cable can be tensioned by way of the mounting or the holding device. For this purpose, the holding device, in particular, has a sliding sleeve with a fixing sleeve resting against the wheel carrier. In this fixing sleeve, the sliding sleeve can be axially slidably adjusted from a mounting position with a cable end provided with a cable slack with respect to the expanding lock into a fixing position, with a cable end which is then tensioned in the expanding lock, in the fixing sleeve. By means of this holding device, the cable can, on the one hand, have a cable slack for the mounting and, on the other hand, be tensioned in a simple manner.

The sliding sleeve has a first sleeve projection which rests directly against the wheel carrier and which is followed by a sleeve part which is continued in the fixing sleeve and has a larger diameter. Between the sleeve part of the sliding sleeve and the fixing sleeve, locking devices are arranged which permit a sliding in the fixing sleeve in the mounting position and, in the fixing position, are lockingly arranged in a recess of the fixing sleeve. As a result of this construction of the sliding sleeve in the fixing sleeve with the interposed locking devices, it is achieved that the sliding sleeve can be slid from the mounting position into the fixing position while taking along the cable sheath, and in this fixing position, a flow of force takes place from the wheel carrier by way of the fixing sleeve and by way of the locking devices and by way of the stop ring into the holding ring and then into the sliding sleeve.

In particular, in the fixing position, the recess for the locking devices is bounded by a stop ring which is connected with the sliding sleeve and can be fixed by way of an inserted holding ring. The stop ring is arranged particularly between the inserted holding ring and another holding ring screwed-on at the sliding sleeve.

The stop ring is held in its position by the holding ring and a step in the sliding sleeve. The diameter of this step is selected such that, in the case of a possibly required demounting of the cable, the fixing sleeve with locking devices can be pushed back after the removal of the holding ring. This permits a simple lifting-out of the cable nipple.

In addition, by means of the mounting arrangement, it is achieved that the adjusting of the cable length is not used up by the adjustment of the cable at the foot parking brake.

Other objects, advantages and novel features of the present invention will become apparent from the following detailed description of the invention when considered in conjunction with the accompanying drawings.

DETAILED DESCRIPTION OF THE DRAWINGS

Figure 1:
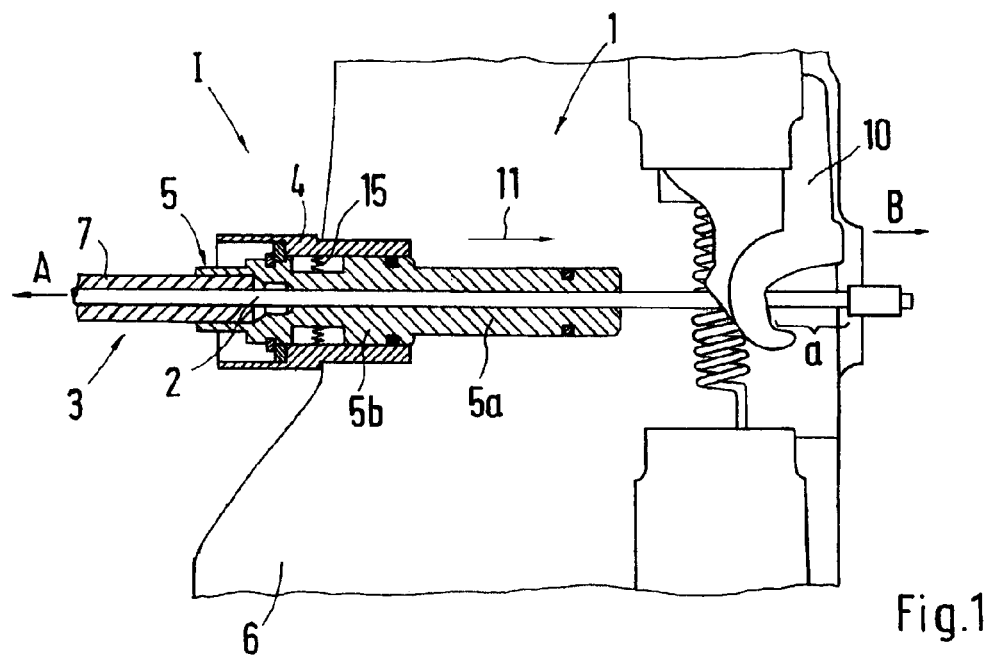
FIG. 1 is a view of a mounting arrangement in the wheel carrier with the sliding sleeve and the fixing sleeve in a mounting position with the slack cable end in the expanding lock, constructed according to a preferred embodiment of the present invention.

The holding device 1 for a cable 2 of a cable control 3 of a foot parking brake comprises essentially a sliding sleeve 5 which can be axially moved in a fixing sleeve 4. The fixing sleeve 4 rests against a wheel carrier 6 which is only outlined. A cable sheath 7 is fixed in the sliding sleeve 5, and the cable penetrates the sliding sleeve 5 and is guided in the direction A of the arrow to a transmitting device (of a foot parking brake which is not shown) and in the direction B of the arrow to an expanding lock 10 on the shoe-type braking device.

The mounting position I is illustrated in FIG. 1, in which, for being hung into the expanding lock 10, the cable 2 is constructed with a so-called "cable slack", for example, of the extent a, so that a fastening can take place in a simple manner by means of this expanding lock 10. So that this cable slack can be achieved, the sliding sleeve 5 is axially slid in the direction 11 of the arrow in the wheel carrier 6 together with the fixing sleeve 4.

Figure 2:
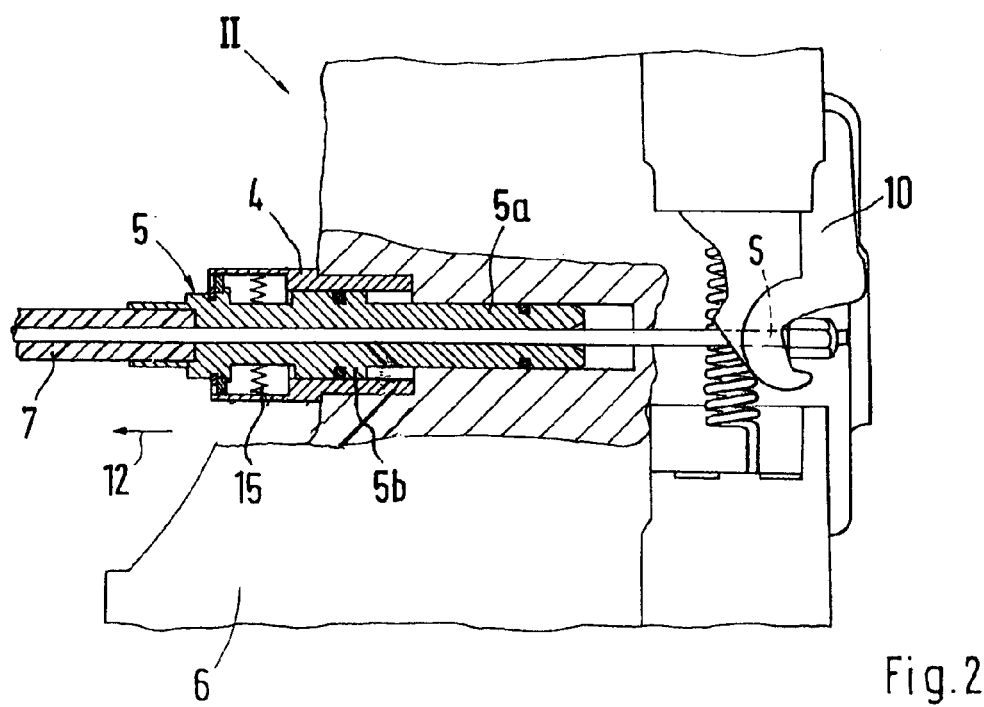
FIG. 2 is a view of the mounting arrangement according to FIG. 1 in a fixing position while the cable end is tensioned in the expanding lock.

The fixing position II is illustrated in FIG. 2, in which the cable slack is eliminated to the extent a and the cable end is held in a tensioned manner in the expanding lock 10. For this purpose, the sliding sleeve 5 is slid in the fixing sleeve 4 in the direction 12 of the arrow, the sleeve 4 being held manually in its position on the wheel carrier 6.

Figure 3:
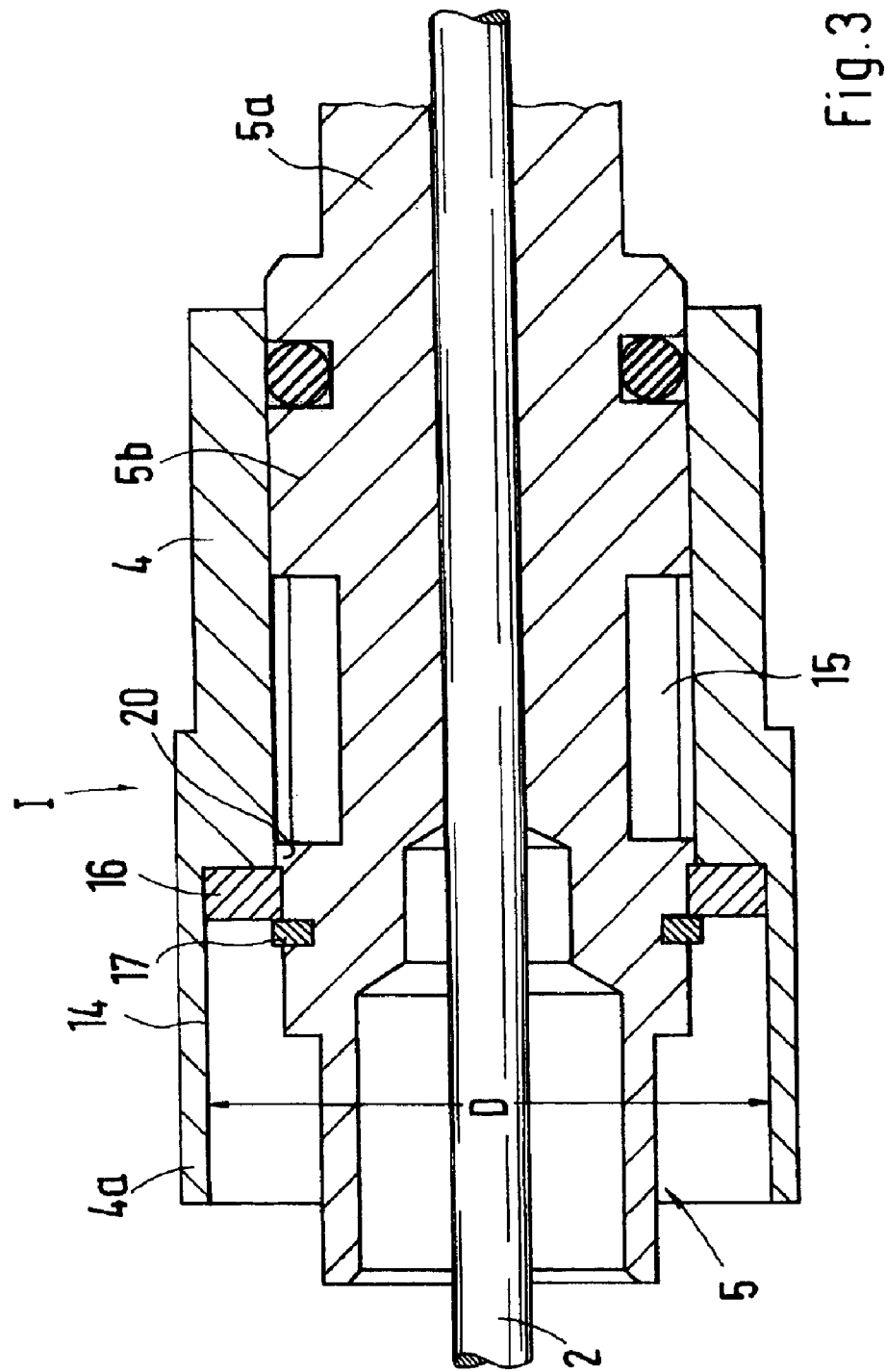
FIG. 3 is an enlarged representation of the mounting arrangement according to FIG. 1 in a mounting position.
Figure 4:
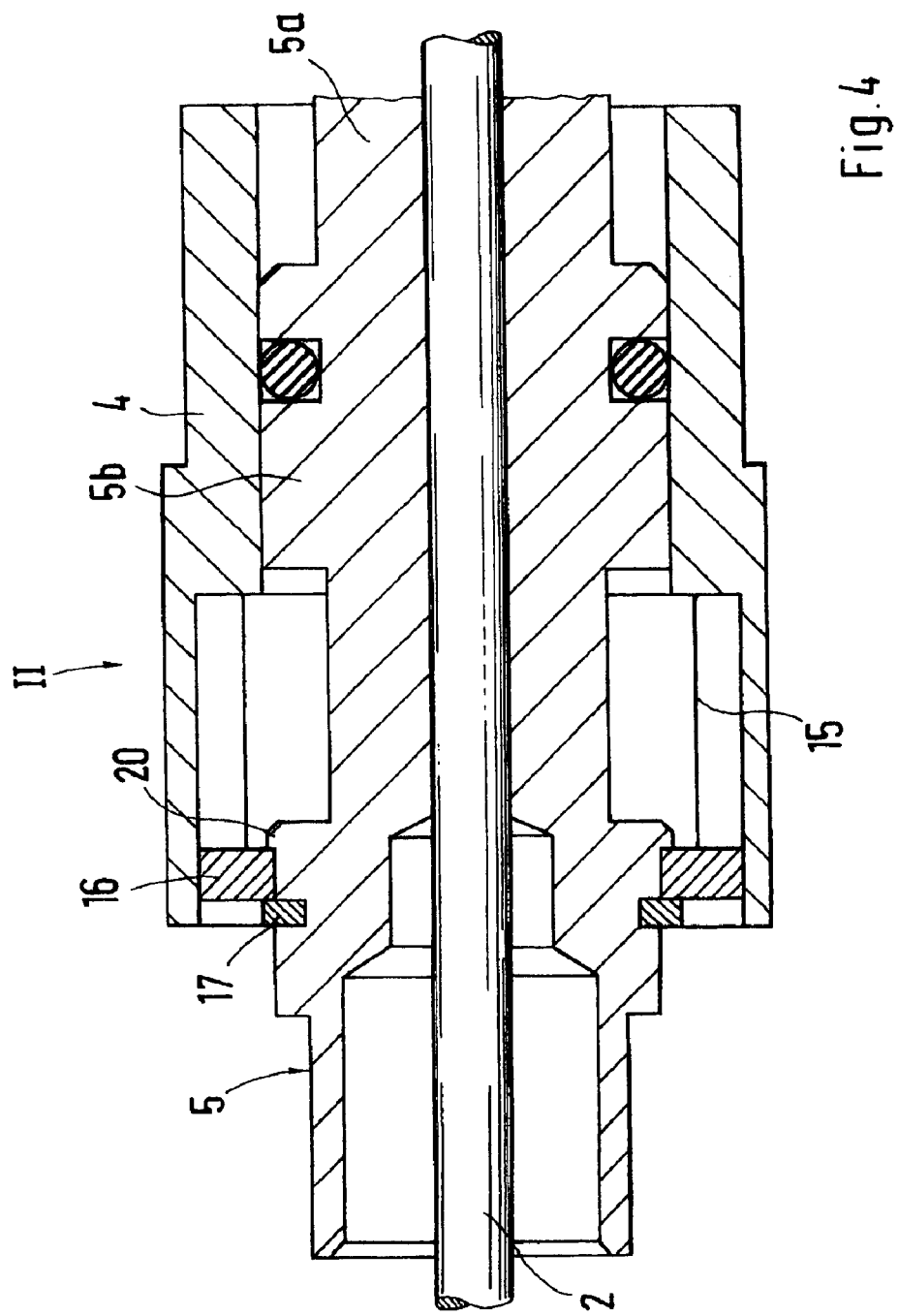
FIG. 4 is an enlarged representation of the mounting arrangement according to FIG. 2 in a fixing position.

The sliding sleeve 5 has a first sleeve projection 5a which is held directly in the wheel carrier 6 and which is followed by a second sleeve part 5b which has a larger diameter and is provided with a recess in which springy locking devices 15, such as leaf springs or spring devices with a similar effect, are arranged, as illustrated particularly in FIG. 3.

The cable sheath 7 is supported on the front-side of the sliding sleeve 5 so that, when the sleeve 5 is slid relative to the fixing sleeve 4, the cable sheath 7 with the cable 2 is taken along in the direction 12 of the arrow. When a set-off area 14 in the fixing sleeve 4 which has a larger diameter D is reached in section 4a, the locking devices 15, bounded by a stop ring 16 on the sliding sleeve 5, can be supported on the fixing sleeve 4. The stop ring 16 is held between holding rings 17 and 20 of the sliding sleeve 5. In this fixing position II, the cable slack, as illustrated in detail in FIG. 2, is completely eliminated.

When the foot parking brake is loaded in the fixing position II, a so-called flux of force takes place from the wheel carrier 6 by way of the fixing sleeve 4 and by way of the locking devices 15 to the stop ring 16 and from there by way of the holding ring 17 into the sliding sleeve 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Mounting arrangement for a cable control of a parking brake of a motor vehicle, particularly for a foot parking brake, a cable sheath of the cable control being arranged by way of a holding device in a wheel carrier, and a cable guided in the cable sheath being able to be hung by means of its one end in an expanding lock of a braking device and by means of its other cable end, which faces away, being held in a transmitting device which can be connected with a pedal of a parking brake, wherein the holding device comprises a sliding sleeve with a fixing sleeve which rests against the wheel carrier and in which the sliding sleeve can be axially slidably adjusted from a mounting position with a cable end held with a cable slack with respect to the expanding lock into a fixing position, with a cable end, which is held in a tensioned manner in the expanding lock, in the fixing sleeve.

wherein locking devices are arranged between the sliding sleeve and the fixing sleeve, which locking devices are arranged to be displaceable with respect to the fixing sleeve in the mounting position and are arranged to be locking in a recess of the fixing sleeve in the fixing position, and wherein the recess in the fixing sleeve is formed by a section of the fixing sleeve which has a large inside diameter and which, in the fixing position, is bounded by a stop ring which is connected with the sliding sleeve and is fixed between holding rings.

2. Arrangement according to claim 1, wherein the stop ring is arranged between an inserted holding ring and another holding ring screwed to the sliding sleeve.

3. Arrangement according to claim 2, wherein, while taking along the cable sheath, the sliding sleeve can be slid from the mounting position into the fixing position and, in this position, a flux of force extends from the wheel carrier by way of the fixing sleeve, the locking devices, the stop ring and by way of the holding ring into the sliding sleeve.

4. Mounting arrangement for a cable control of a parking brake of a motor vehicle, particularly for a foot parking brake, a cable sheath of the cable control being arranged by way of a holding device in a wheel carrier, and a cable guided in the cable sheath being able to be hung by means of its one end in an expanding lock of a braking device and by means of its other cable end, which faces away, being held in a transmitting device which can be connected with a pedal of a parking brake, wherein the holding device comprises a sliding sleeve with a fixing sleeve which rests against the wheel carrier and in which the sliding sleeve can be axially slidably adjusted from a mounting position with a cable end held with a cable slack with respect to the expanding lock into a fixing position, with a cable end, which is held in a tensioned manner in the expanding lock, in the fixing sleeve, wherein the sliding sleeve has a first sleeve projection held directly in the wheel carrier, which sleeve projection is followed by a second sleeve part which is continued in the fixing sleeve and has a larger inside diameter, wherein locking devices are arranged between the second sleeve part of the sliding sleeve and the fixing sleeve, which locking devices are arranged to be displaceable with respect to the fixing sleeve in the mounting position and are arranged to be locking in a recess of the fixing sleeve in the fixing position; and wherein the recess in the fixing sleeve is formed by a section of the fixing sleeve which has a large inside diameter and which, in the fixing position, is bounded by a stop ring which is connected with the sliding sleeve and is fixed between holding rings.

5. Arrangement according to claim 4, wherein the stop ring is arranged between an inserted holding ring and another holding ring screwed to the sliding sleeve.

6. Arrangement according to claim 5, wherein, while taking along the cable sheath, the sliding sleeve can be slid from the mounting position into the fixing position and, in this position, a flux of force extends from the wheel carrier by way of the fixing sleeve, the locking devices, the stop ring and by way of the holding ring into the sliding sleeve.

7. Mounting arrangement for a cable control of a parking brake of a motor vehicle, particularly for a foot parking brake, a cable sheath of the cable control being arranged by way of a holding device in a wheel carrier, and a cable guided in the cable sheath being able to be hung by means of its one end in an expanding lock of a braking device and by means of its other cable end, which faces away, being held in a transmitting device which can be connected with a pedal of a parking brake, wherein the holding device comprises a sliding sleeve with a fixing sleeve which rests against the wheel carrier and in which the sliding sleeve can be axially slidably adjusted from a mounting position with a cable end held with a cable slack with respect to the expanding lock into a fixing position, with a cable end, which is held in a tensioned manner in the expanding lock, in the fixing sleeve, wherein locking devices are arranged between a second sleeve part of the sliding sleeve and the fixing sleeve, which locking devices are arranged to be displaceable with respect to the fixing sleeve in the mounting position and are arranged to be locking in a recess of the fixing sleeve in the fixing position, wherein the locking devices consist of leaf springs or radially prestressed spring devices, and wherein the recess in the fixing sleeve is formed by a section of the fixing sleeve which has a large inside diameter and which, in the fixing position, is bounded by a stop ring which is connected with the sliding sleeve and is fixed between holding rings.

8. Arrangement according to claim 7, wherein the stop ring is arranged between an inserted holding ring and another holding ring screwed to the sliding sleeve.

9. Arrangement according to claim 8, wherein, while taking along the cable sheath, the sliding sleeve can be slid from the mounting position into the fixing position and, in this position, a flux of force extends from the wheel carrier by way of the fixing sleeve, the locking devices, the stop ring and by way of the holding ring into the sliding sleeve.

10. Mounting arrangement for a cable control of a parking brake of a motor vehicle, particularly for a foot parking brake, a cable sheath of the cable control being arranged by way of a holding device in a wheel carrier, and a cable guided in the cable sheath being able to be hung by means of its one end in an expanding lock of a braking device and by means of its other cable end, which faces away, being held in a transmitting device which can be connected with a pedal of a parking brake, wherein the holding device comprises a sliding sleeve with a fixing sleeve which rests against the wheel carrier and in which the sliding sleeve can be axially slidably adjusted from a mounting position with a cable end held with a cable slack with respect to the expanding lock into a fixing position, with a cable end, which is held in a tensioned manner in the expanding lock, in the fixing sleeve, wherein the sliding sleeve has a first sleeve projection held directly in the wheel carrier, which sleeve projection is followed by a second sleeve part which is continued in the fixing sleeve and has a larger inside diameter, wherein locking devices are arranged between the second sleeve part of the sliding sleeve and the fixing sleeve, which locking devices are arranged to be displaceable with respect to the fixing sleeve in the mounting position and are arranged to be locking in a recess of the fixing sleeve in the fixing position, wherein the locking devices comprise leaf springs or radially prestressed spring devices, and wherein the recess in the fixing sleeve is formed by a section of the fixing sleeve which has a large inside diameter and which, in the fixing position, is bounded by a stop ring which is connected with the sliding sleeve and is fixed between holding rings.

11. Arrangement according to claim 10, wherein the stop ring is arranged between an inserted holding ring and another holding ring screwed to the sliding sleeve.

12. Arrangement according to claim 11, wherein, while taking along the cable sheath, the sliding sleeve can be slid from the mounting position into the fixing position and, in this position, a flux of force extends from the wheel carrier by way of the fixing sleeve, the locking devices, the stop ring and by way of the holding ring into the sliding sleeve.

* * * * *